(12) United States Patent
Seda et al.

(10) Patent No.: US 7,195,446 B2
(45) Date of Patent: Mar. 27, 2007

(54) COUNTER-ROTATING TURBINE ENGINE AND METHOD OF ASSEMBLING SAME

(75) Inventors: Jorge Francisco Seda, Cincinnati, OH (US); Thomas Ory Moniz, Loveland, OH (US); Lawrence Butler, Eydon (GB)

(73) Assignee: General Electric Company, Schenectady, NY (US)

( * ) Notice: Subject to any disclaimer, the term of this patent is extended or adjusted under 35 U.S.C. 154(b) by 174 days.

(21) Appl. No.: 10/976,496

(22) Filed: Oct. 29, 2004

(65) Prior Publication Data

US 2006/0093466 A1    May 4, 2006

(51) Int. Cl.
*F01D 1/24* (2006.01)

(52) U.S. Cl. .................... 415/65; 415/68; 415/69; 415/229

(58) Field of Classification Search ............ 415/65, 415/68, 69, 229; 416/122, 128
See application file for complete search history.

(56) References Cited

U.S. PATENT DOCUMENTS

| | | | | |
|---|---|---|---|---|
| 3,861,139 | A | * | 1/1975 | Jones .................... 60/226.1 |
| 4,950,089 | A | * | 8/1990 | Jones .................... 384/103 |
| 5,307,622 | A | * | 5/1994 | Ciokajlo et al. ......... 60/39.162 |
| 5,450,719 | A | | 9/1995 | Marsh |
| 5,806,303 | A | | 9/1998 | Johnson |
| 5,809,772 | A | | 9/1998 | Giffin, III et al. |
| 5,813,214 | A | | 9/1998 | Moniz et al. |
| 5,867,980 | A | | 2/1999 | Bartos |
| 6,286,303 | B1 | * | 9/2001 | Pfligler et al. ............ 60/805 |
| 6,619,030 | B1 | * | 9/2003 | Seda et al. ............... 60/226.1 |
| 6,684,626 | B1 | | 2/2004 | Orlando et al. |
| 6,711,887 | B2 | | 3/2004 | Orlando et al. |
| 6,725,643 | B1 | | 4/2004 | Paul |
| 6,732,502 | B2 | | 5/2004 | Seda et al. |
| 6,739,120 | B2 | | 5/2004 | Moniz et al. |
| 6,763,652 | B2 | | 7/2004 | Baughman et al. |
| 6,763,653 | B2 | | 7/2004 | Orlando et al. |
| 6,763,654 | B2 | | 7/2004 | Orlando et al. |
| 2004/0042692 | A1 | | 3/2004 | Matsunaga |

FOREIGN PATENT DOCUMENTS

| | | |
|---|---|---|
| EP | 1403485 A2 | 3/2004 |
| WO | WO-02/43464 | 6/2002 |

OTHER PUBLICATIONS

International Search Report; European Patent Office; Place of Search Munich; Ref. No. 130556/10897; Application No. 05255228.8-2315 PCT; Date Oct. 19, 2005; 8 pgs.

* cited by examiner

*Primary Examiner*—Ninh H. Nguyen
(74) *Attorney, Agent, or Firm*—William Scott Andes; Armstrong Teasdale LLP

(57) ABSTRACT

A method for assembling a gas turbine engine that includes providing a low-pressure turbine inner rotor configured to rotate in a first direction, providing a low-pressure turbine outer rotor configured to rotate in a second direction that is opposite the first rotational direction, and coupling at least one foil bearing to at least one of the inner and outer rotors to facilitate improving clearance control between a first rotating component and at least one of a second rotating component and a non-rotating component.

20 Claims, 9 Drawing Sheets

COUNTER-ROTATING TURBINE ENGINE AND METHOD OF ASSEMBLING SAME

STATEMENT REGARDING FEDERALLY SPONSORED RESEARCH & DEVELOPMENT

The U.S. Government may have certain rights in this invention pursuant to Take Order NAS2-01135 Task Order #2.

BACKGROUND OF THE INVENTION

This invention relates generally to aircraft gas turbine engines, and more specifically to counter-rotating gas turbine engines.

At least one known gas turbine engine includes, in serial flow arrangement, a forward fan assembly, an aft fan assembly, a high-pressure compressor for compressing air flowing through the engine, a combustor for mixing fuel with the compressed air such that the mixture may be ignited, and a high-pressure turbine. The high-pressure compressor, combustor and high-pressure turbine are sometimes collectively referred to as the core engine. In operation, the core engine generates combustion gases which are discharged downstream to a counter-rotating low-pressure turbine that extracts energy therefrom for powering the forward and aft fan assemblies. Within at least some known gas turbine engines, at least one turbine rotates in an opposite direction than the other rotating components within the engine At least one known counter-rotating low-pressure turbine has an inlet radius that is larger than a radius of the high-pressure turbine discharge. The increased size of the inlet radius accommodates additional stages within the low-pressure turbine. Specifically, at least one known counter-rotating low-pressure turbine includes an outer turbine having a first quantity of low-pressure stages that are rotatably coupled to the forward fan assembly, and an inner turbine having an equal number of stages that is rotatably coupled to the aft fan assembly.

During engine assembly, such known gas turbine engines are assembled such that the outer turbine is cantilevered from the turbine rear frame. More specifically, the first quantity of stages of the outer turbine are each coupled together and to the rotating casing, and the outer turbine is then coupled to the turbine rear frame using only the last stage of the outer turbine, such that only the last stage of the outer turbine supports the combined weight of the outer turbine rotating casing. Accordingly, to provide the necessary structural strength to such engines, the last stage of the outer turbine is generally much larger and heavier than the other stages of the outer turbine. As such, during operation, the performance penalties associated with the increased weight and size may actually negate the benefits of utilizing a counter-rotating low-pressure turbine.

BRIEF DESCRIPTION OF THE INVENTION

In one aspect, a method for assembling a gas turbine engine is provided. The method includes providing a low-pressure turbine inner rotor configured to rotate in a first direction, providing a low-pressure turbine outer rotor configured to rotate in a second direction that is opposite the first rotational direction, and coupling at least one foil bearing to at least one of the inner and outer rotors to facilitate improving clearance control between a first rotating component and at least one of a second rotating component and a non-rotating component.

In another aspect, a rotor assembly is provided. The rotor assembly includes an inner rotor configured to rotate in a first rotational direction, an outer rotor configured to rotate in a second rotational direction that is opposite the first rotational direction, and a foil bearing configured to support at least one of the inner and outer rotors.

In a further aspect, a gas turbine engine is provided. The gas turbine engine includes a low-pressure counter-rotating turbine including an inner rotor configured to rotate in a first rotational direction, and an outer rotor configured to rotate in a second rotational direction that is opposite the first rotational direction, and a foil bearing configured to support at least one of the inner and outer rotors.

DETAILED DESCRIPTION OF THE INVENTION

Figure 1:
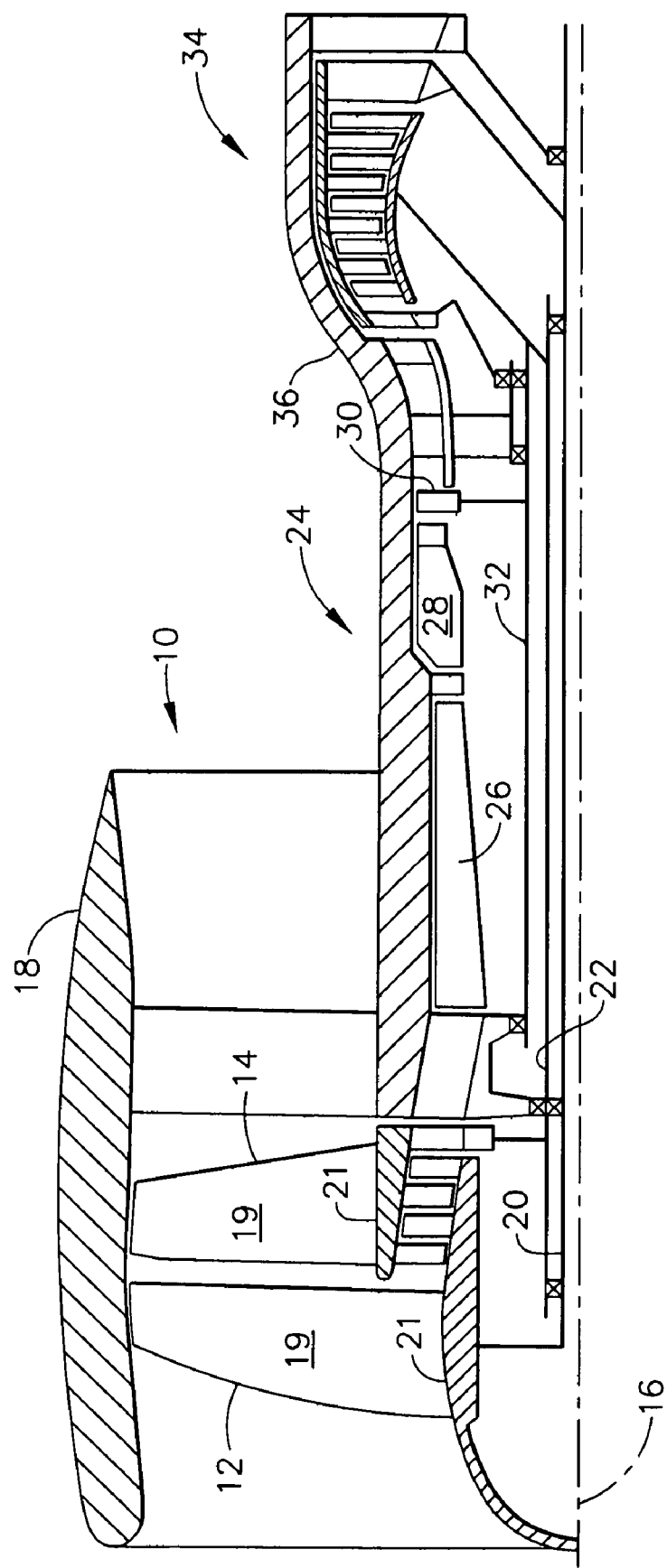
FIG. 1 is a cross-sectional view of a portion of an exemplary gas turbine engine.

FIG. 1 is a cross-sectional view of a portion of an exemplary gas turbine engine 10 that includes a forward fan assembly 12 and an aft fan assembly 14 disposed about a longitudinal centerline axis 16. The terms "forward fan" and "aft fan" are used herein to indicate that one of the fans 12 is coupled axially upstream from the other fan 14. In one embodiment, fan assemblies 12 and 14 are positioned at a forward end of gas turbine engine 10 as illustrated. In an alternative embodiment, fan assemblies 12 and 14 are positioned at an aft end of gas turbine engine 10. Fan assemblies 12 and 14 each include a plurality of rows of fan blades 19 positioned within a nacelle 18. Blades 19 are joined to respective rotor disks 21 that are rotatably coupled through a respective fan shaft 20 to forward fan assembly 12 and through a fan shaft 22 to aft fan assembly 14.

Gas turbine engine 10 also includes a core engine 24 that is downstream from fan assemblies 12 and 14. Core engine 24 includes a high-pressure compressor (HPC) 26, a combustor 28, and a high-pressure turbine (HPT) 30 that is coupled to HPC 26 via a core rotor or shaft 32. In operation, core engine 24 generates combustion gases that are channeled downstream to a counter-rotating low-pressure turbine 34 which extracts energy from the gases for powering fan assemblies 12 and 14 through their respective fan shafts 20 and 22.

Figure 2:
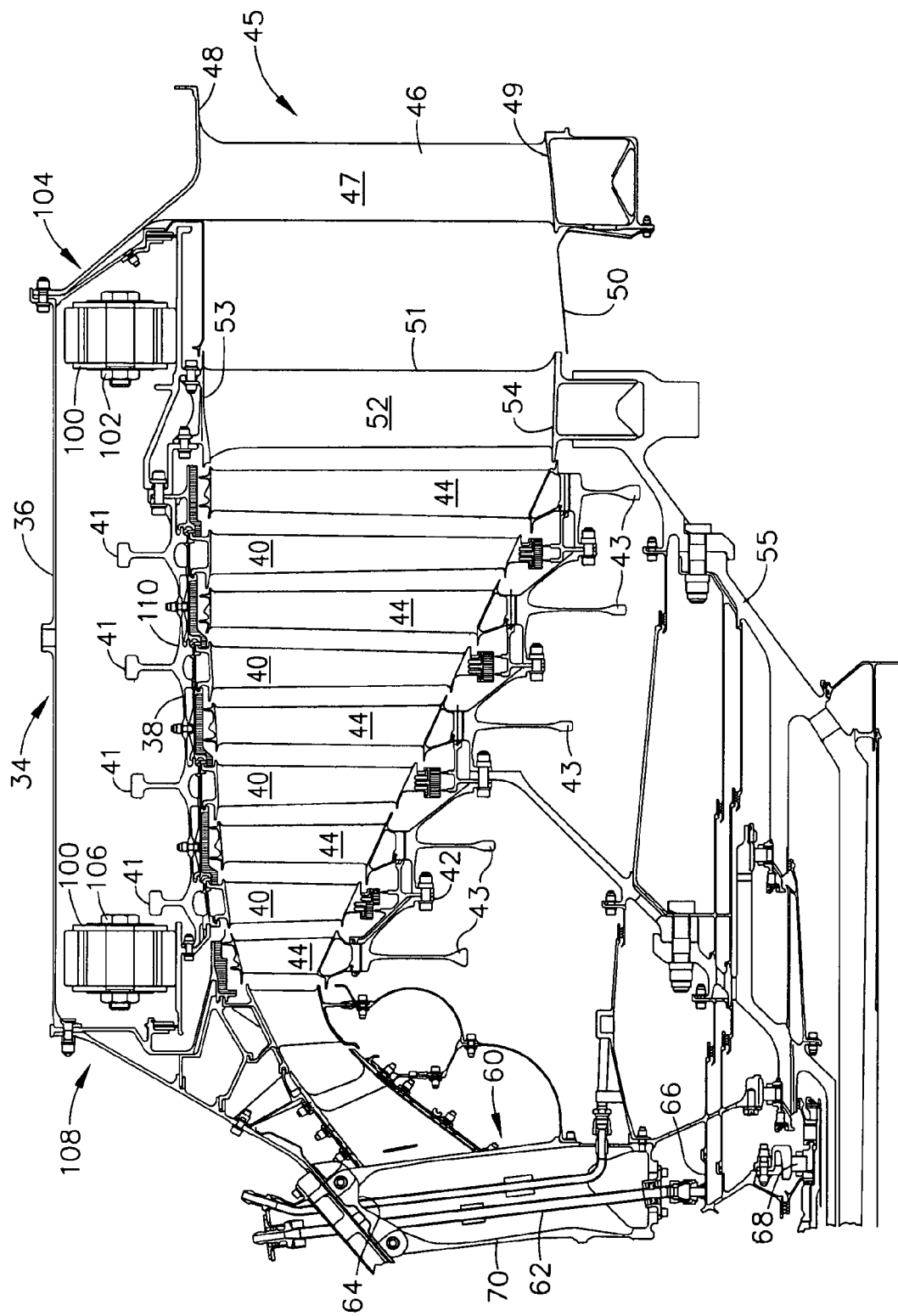
FIG. 2 is a cross-sectional view of a portion of an exemplary counter-rotating low-pressure turbine.

FIG. 2 is a cross-sectional view of a portion of counter-rotating low-pressure turbine 34. In the exemplary embodiment, low-pressure turbine 34 includes a stationary outer casing 36 that is coupled to core engine 24 downstream from high-pressure turbine 30 (shown in FIG. 1). Low-pressure turbine 34 includes a radially outer rotor 38 that is positioned radially inwardly of outer casing 36. Outer rotor 38 has a generally frusto-conical shape and includes a plurality of circumferentially-spaced rotor blades 40 that extend radially inwardly. Blades 40 are arranged in axially-spaced blade rows or stages 41. Although, the exemplary embodiment only illustrates four stages 41, it should be realized that outer rotor 38 may have any quantity of stages 41 without affecting the scope of the method and apparatus described herein.

Low-pressure turbine 34 also includes a radially inner rotor 42 that is aligned substantially coaxially with respect to, and radially inward of, outer rotor 38. Inner rotor 42 includes a plurality of circumferentially-spaced rotor blades 44 that extend radially outwardly and are arranged in axially-spaced rows or stages 43. Although, the exemplary embodiment only illustrates five stages, it should be realized that inner rotor 42 may have any quantity of stages without affecting the scope of the method and apparatus described herein.

In the exemplary embodiment, inner rotor blades 44 extending from stages 43 are axially-interdigitated with outer rotor blades 40 extending from stages 41 such that inner rotor stages 43 extend between respective outer rotor stages 41. The blades 40 and 44 are therefore configured for counterrotation of the rotors 38 and 42.

In the exemplary embodiment, low-pressure turbine 34 also includes a rotor support assembly 45 that includes a stationary annular rear frame 46 that is aft of low-pressure turbine outer and inner blades 40 and 44. Rear frame 46 includes a plurality of circumferentially-spaced struts 47 that are coupled at their outer ends to an annular outer band 48 that is coupled to outer casing 36, and coupled at their inner ends to an annular inner band or hub 49. Rear frame 46 also includes an annular non-structural flowpath extension 50 that extends radially inward. In the exemplary embodiment, rear struts 47 are positioned in flow communication with an aft end of low-pressure turbine 34 for receiving the combustion gases therefrom.

A rotatable aft frame 51 is positioned aft of outer and inner blades 40 and 44 and upstream from rear frame 46. Frame 51 is coupled to an aft end of outer rotor 38 for rotation therewith and to facilitate providing additional rigidity for supporting blades 40. Aft frame 51 includes a plurality of circumferentially-spaced struts 52 that are coupled to radially outer and inner annular aft bands 53 and 54 such that inner aft band 54 is fixedly secured to an annular aft support shaft 55 for rotation therewith. Shaft 55 extends radially inward from, and upstream from, rear frame 46. Outer and inner bands 53 and 54, respectively, facilitate coupling together circumferentially-spaced struts 52 together to form a relatively rigid assembly. Accordingly, the combination of circumferentially-spaced struts 52 and outer and inner bands 53 and 54 facilitate transferring loads from outer rotor 38 to outer casing 36 through an aft foil bearing 100. Foil bearing 100 may eliminate the need to transfer loads from outer rotor 38 to rear frame 46 through an additional aft bearing/housing structure (not shown).

An annular mid-frame 60 is upstream from outer and inner blades 40 and 44 and includes a plurality of circumferentially-spaced forward struts 62 that are coupled to a radially outer front band 64 and to a radially inner front band 66. Inner front band 66 is also coupled to an annular shaft 68 that extends radially inward from band 66. In the exemplary embodiment, turbine mid-frame 60 is fixedly secured to outer casing 36 via outer front band 64. In the exemplary embodiment, forward struts 62 are enclosed by a fairing 70 that facilitates shielding struts 62 from hot combustion gases flowing through engine 10. In another embodiment, struts 62 are not enclosed by fairing 70.

In the exemplary embodiment, gas turbine engine 10 includes a plurality of foil bearings 100 that are positioned between outer rotor 38 and casing 36. In one embodiment, a first quantity of bearings 102 are positioned at an aft end 104 of low-pressure turbine 34, and a second quantity of bearings 106 are positioned at a forward end 108 of low-pressure turbine 34. Foil bearings 100 facilitate providing structural support to low-pressure turbine 34 during maneuver loading. More specifically, foil bearings 100 are circumferentially spaced about an exterior surface 110 of outer rotor 38 to facilitate providing rotational support to low-pressure turbine 34. More specifically, and in the exemplary embodiment, four foil bearings are circumferentially spaced approximately equidistantly about an outer periphery of low-pressure turbine 34 at aft end 104, and four foil bearings are circumferentially spaced approximately equidistantly about an outer periphery of low-pressure turbine 34 at forward end 108. Accordingly, in the exemplary embodiment, a weight of low-pressure turbine 34 is distributed approximately equally about the circumference of gas turbine engine 10 at both forward and aft ends 108 and 104 respectively.

Figure 4:
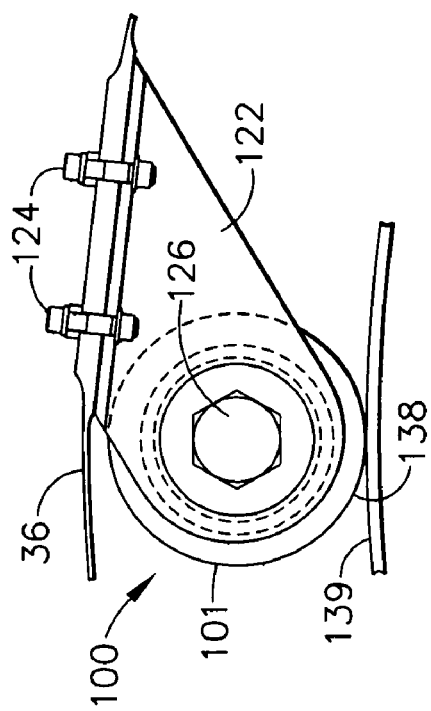
FIG. 4 is a side view of foil bearing assembly 100 taken along view B—B.
Figure 3:
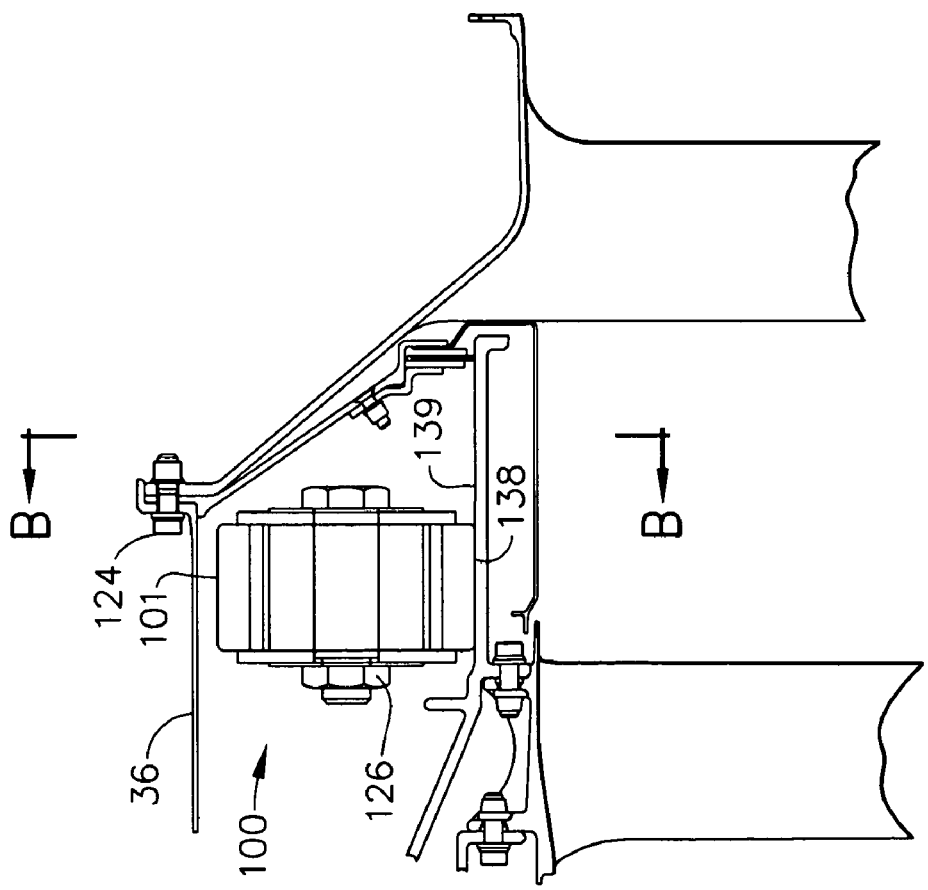
FIG. 3 is an enlarged view of an aft portion of counter-rotating low-pressure turbine including the exemplary foil bearing shown in FIG. 2.
Figure 5:
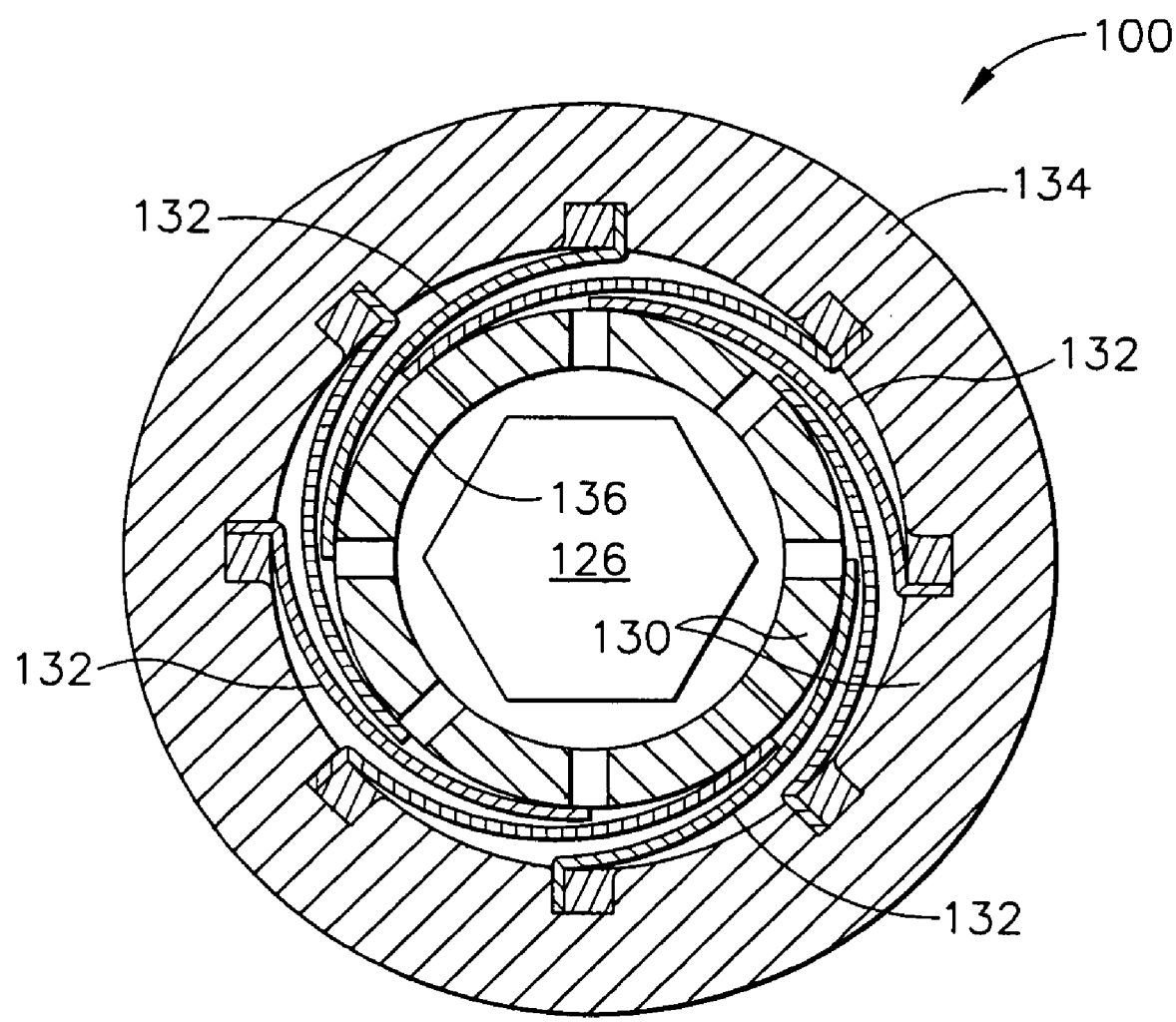
FIG. 5 is an side view of an exemplary foil bearing.

FIG. 3 is an enlarged view of an aft portion of counter-rotating low-pressure turbine 34 including foil bearing assembly 100. FIG. 4 is a side view of foil bearing assembly 100 taken along view B—B. FIG. 5 is an side view of an exemplary foil bearing 101. In the exemplary embodiment, foil bearing assembly 100 includes a support member 122 that is fixedly secured to casing 36 using a plurality of fasteners 124 and is rotatably coupled to foil bearing 101 using at least one fastener 126.

In the exemplary embodiment, foil bearing 101 includes a paired race 130, and at least one foil element 132. Paired race 130 includes an outer race 134 and an inner race 136 that is radially inward from outer race 134. Foil elements 132 extend between inner race 136 and outer race 134 and each include a plurality of compliant metal foils 132 that are each secured to outer race 134 to facilitate inner race 136 rotating relative to outer race 134, or, as in this embodiment, outer race 134 rotating relative to inner race 136. In the exemplary embodiment, foil bearings 101 facilitate reducing the affects of maneuver loads on counter-rotating low-pressure turbine 34 while also increasing clearance control and sealing between the rotors. Further, using foil bearings within gas turbine engine 10 facilitates reducing a fabrication cost of the gas turbine engine since the foil bearings do not require lubrication, have no DN speed limit, wherein D is defined as a diameter of the bearing bore in millimeters, and N is defined as the top speed of the bearing in revolutions per minute, require no maintenance, and are self-acting hydrodynamic "float on air" devices.

In the exemplary embodiment, during engine operation, a radial force generated during rotation of low-pressure turbine 34 is transmitted to foil bearings 101. More, specifically, as low-pressure turbine 34 rotates, an exterior surface 138 of foil bearing 101 contacts an exterior surface 139 of low-pressure turbine 34 to facilitate reducing radial movement of low-pressure turbine 34. Since each respective foil bearing 101 is coupled to outer casing 36 through support member 122, low-pressure turbine 34 maintains a relatively constant radial position with respect to outer casing 36. More specifically, as low-pressure turbine 34 is forced radially outward during operation, because foil bearing 101 is attached to outer casing 36, any radial movement of low-pressure turbine 34 is transmitted to casing 36 such that low-pressure turbine 34 is maintained in a relatively constant radial position with respect to outer casing 36.

Figure 6:
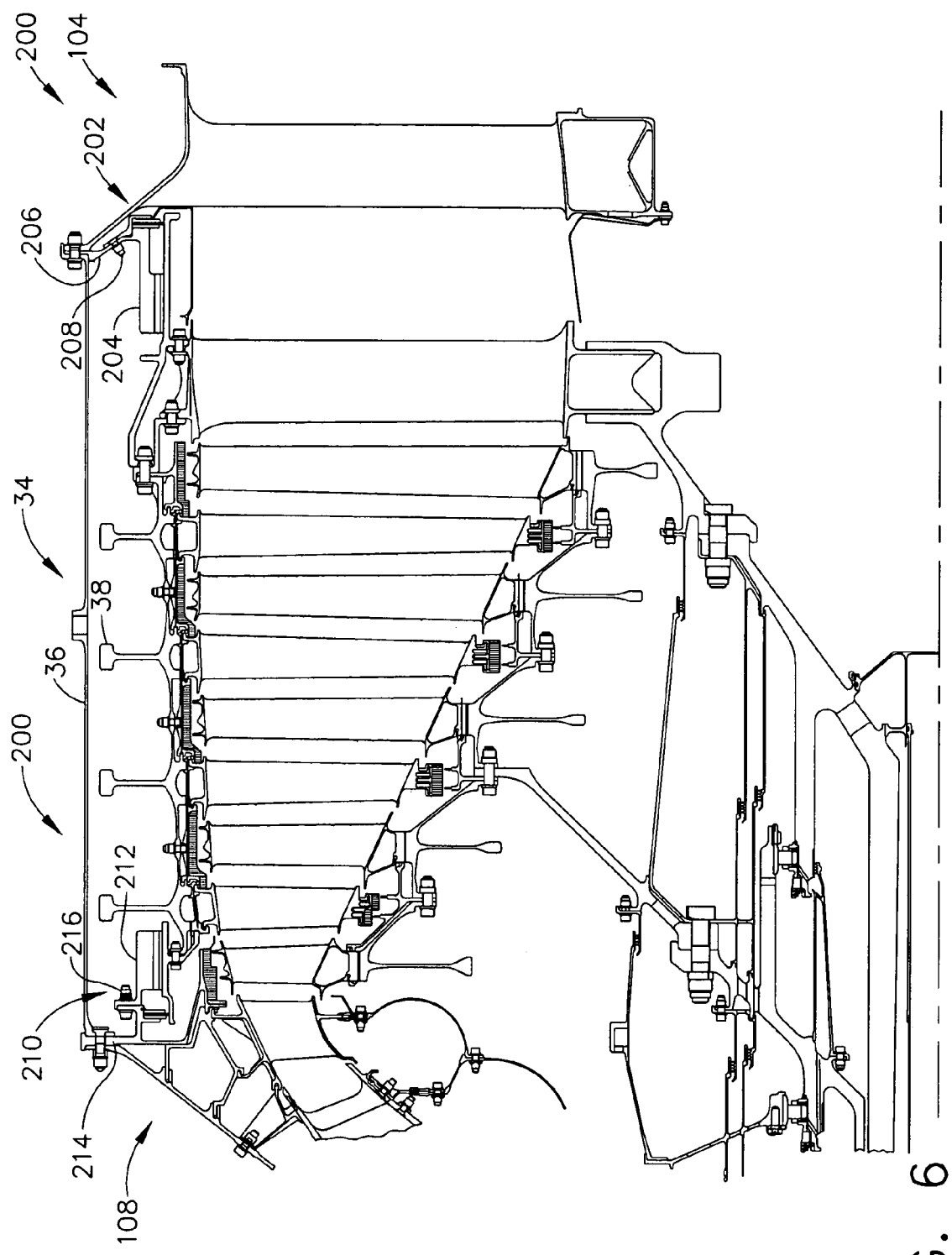
FIG. 6 is a cross-sectional view of a portion of counter-rotating low-pressure turbine that includes an exemplary foil bearing.
Figure 8:
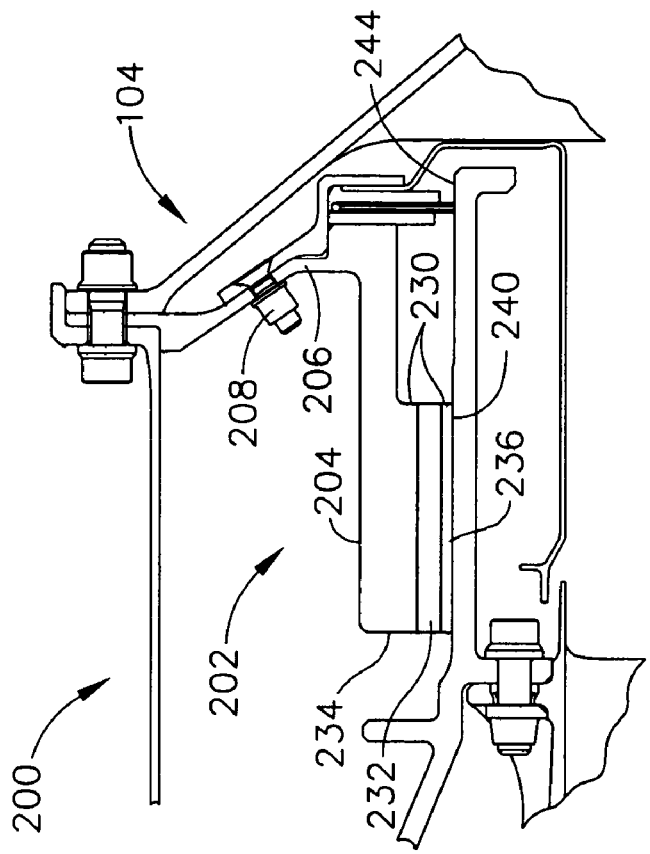
FIG. 8 is an expanded view of an aft portion of counter-rotating low-pressure turbine including the exemplary foil bearing shown in FIG. 6.
Figure 7:
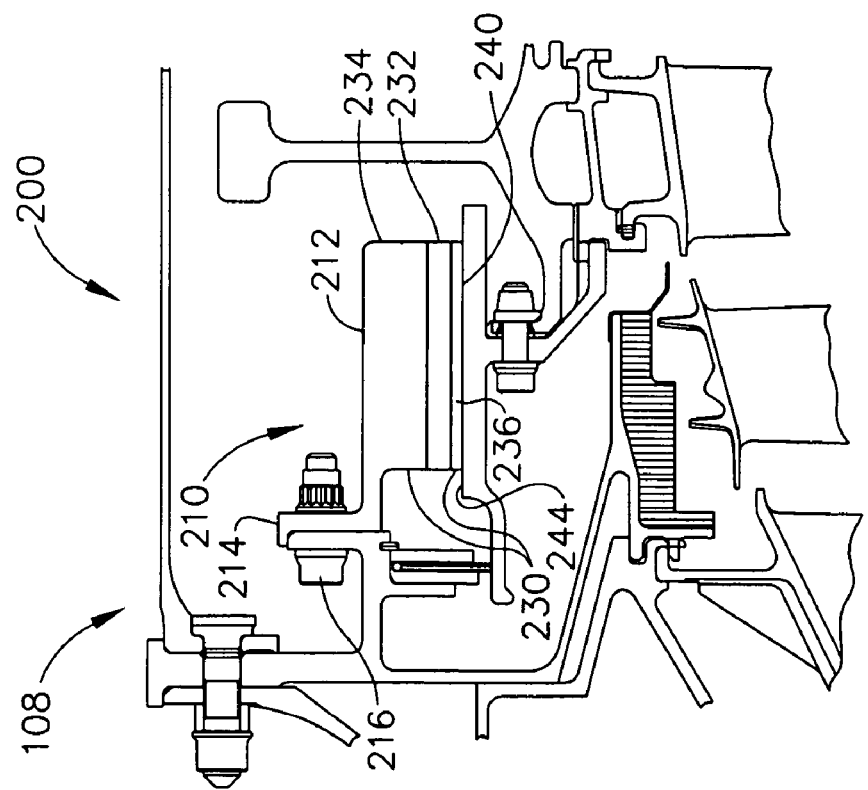
FIG. 7 is an expanded view of a forward portion of counter-rotating low-pressure turbine including the exemplary foil bearing shown in FIG. 6.

FIG. 6 is a cross-sectional view of a portion of counter-rotating low-pressure turbine 34 including an exemplary foil bearing assembly 200. FIG. 7 is an enlarged view of a forward portion of counter-rotating low-pressure turbine 34 including foil bearing assembly 200. FIG. 8 is an enlarged view of an aft portion of counter-rotating low-pressure turbine 34 including foil bearing assembly 200.

In the exemplary embodiment, low-pressure turbine 34 includes a first foil bearing assembly 202 low-pressure turbine aft end 104. Bearing assembly 202 includes a foil bearing 204 and a support member 206 that is fixedly secured to casing 36 using a plurality of fasteners 208. Support member 206 is rotatably coupled about an outer periphery of radially outer rotor 38 such that foil bearing 204 circumscribes radially outer rotor 38.

In another exemplary embodiment, gas turbine engine 10 includes a second foil bearing assembly 210 that is positioned at low-pressure turbine forward end 108. In the exemplary embodiment, bearing assembly 210 includes a foil bearing 212 and a support member 214 that is fixedly secured to casing 36 using a plurality of fasteners 216 and is rotatably coupled about an outer periphery of radially outer rotor 38 such that foil bearing 212 circumscribes radially outer rotor 38.

In the exemplary embodiment, foil bearings 204 and 212 each include a paired race 230 and at least one foil element 232. Paired race 230 includes an outer race 234 and an inner race 236 that is radially inward from outer race 234. Foil elements 232 extend between inner race 236 and outer race 234. Specifically, foil bearings 204 and 212 each include a plurality of compliant metal foils 232 that are each coupled to at least one of inner race 236 and/or outer race 234 to facilitate inner race 236 rotating relative to outer race 234. In another embodiment, foil bearings 204 and 212 do not include inner race 236, but rather each includes a plurality of compliant metal foils 232 that are coupled to outer race 234 are frictionally coupled to casing 36. In the exemplary embodiment, foil bearings 204 and 212 facilitate reducing the affects of maneuver loads on counter-rotating low-pressure turbine 34 while also increasing clearance control and sealing between the rotors. Further, using foil bearings within gas turbine engine 10 facilitates reducing a fabrication cost of the gas turbine engine since the foil bearings do not require lubrication, have no DN speed limit, require no maintenance, and are self-acting hydrodynamic "float on air" devices.

In the exemplary embodiment, during engine operation, a radial force generated during rotation of low-pressure turbine 34 is transmitted to foil bearings 204 and 212. Specifically, as low-pressure turbine 34 rotates, an exterior surface 240 of foil bearings 204 and 212 contacts an exterior surface 244 of low-pressure turbine 34 to facilitate reducing radial movement of low-pressure turbine 34. Since each respective foil bearing 204 and 212 is coupled to outer casing 36 through support member 206, low-pressure turbine 34 is maintained in a relatively constant radial position with respect to outer casing 36. More specifically, as low-pressure turbine 34 is forced radially outward during operation, because foil bearings 204 and 212 are each attached to outer casing 36 such that at least one of the inner race 236 and/or metal foils 232 circumscribe an exterior surface of low-pressure turbine 34, any radial movement of low-pressure turbine 34 is transmitted to casing 36 such that low-pressure turbine 34 is maintained in a relatively constant radial position with respect to outer casing 36.

Figure 10:
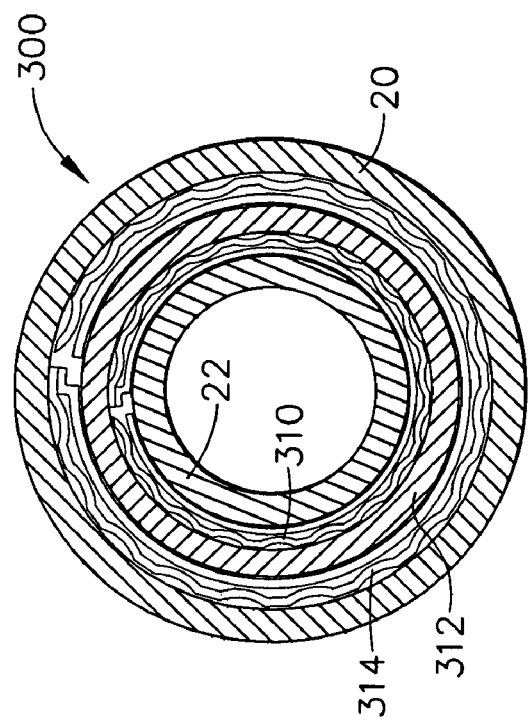
FIG. 10 is an end view of the foil bearing shown in FIG. 9.
Figure 9:
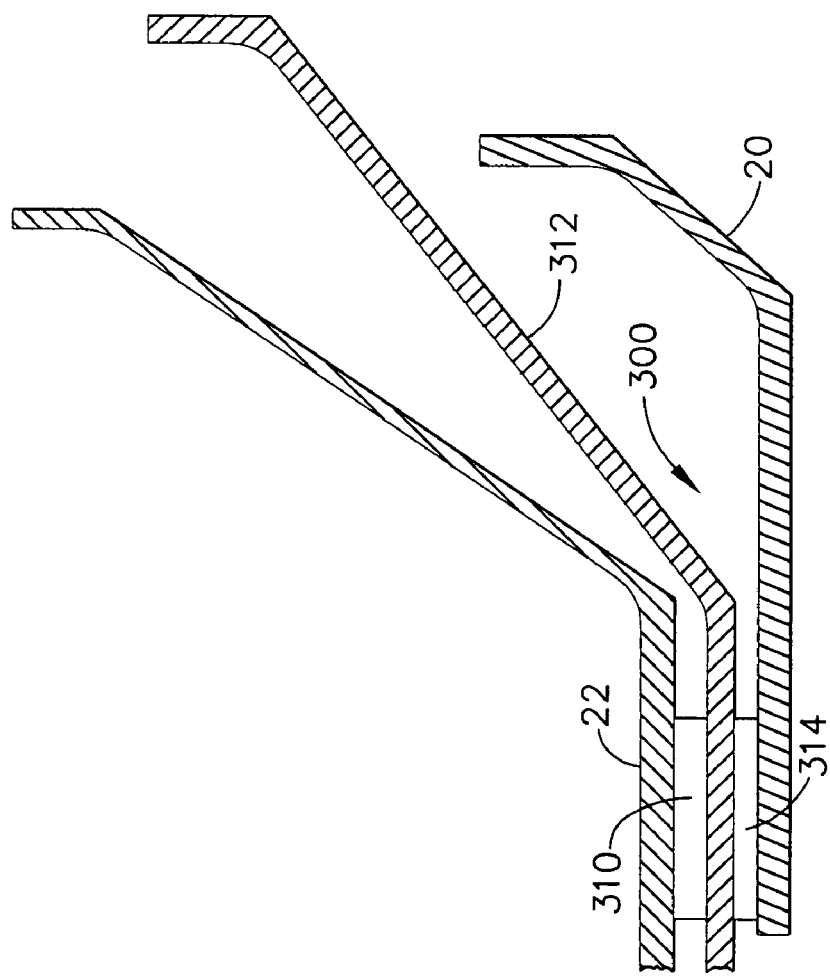
FIG. 9 is a cross-sectional view of a portion of counter-rotating low-pressure turbine that includes an exemplary foil bearing.

FIG. 9 is a cross-sectional view of a portion of counter-rotating low-pressure turbine 34 including an exemplary foil bearing 300. FIG. 10 is an end view of foil bearing 300. In the exemplary embodiment, foil bearing 300 is a differential foil bearing that extends between shafts 20 and 22. More specifically, foil bearing 300 includes a first or outward facing foil pack 310, a center race 312, and a second or inward facing foil pack 314. During operation, foil bearing 300 facilitates reducing shaft deflections between shafts 20 and 22 that may occur when gas turbine engine 10 is operating during maneuvering loads.

In the exemplary embodiment, foil bearing 300 facilitates reducing the affects of maneuver loads on counter-rotating low-pressure turbine 34 while also increasing clearance control and sealing between the rotors. Further, using foil bearings within gas turbine engine 10 facilitates reducing a fabrication cost of the gas turbine engine since the foil bearings do not require lubrication, have no DN speed limit, require no maintenance, and are self-acting hydrodynamic "float on air" devices.

Figure 11:
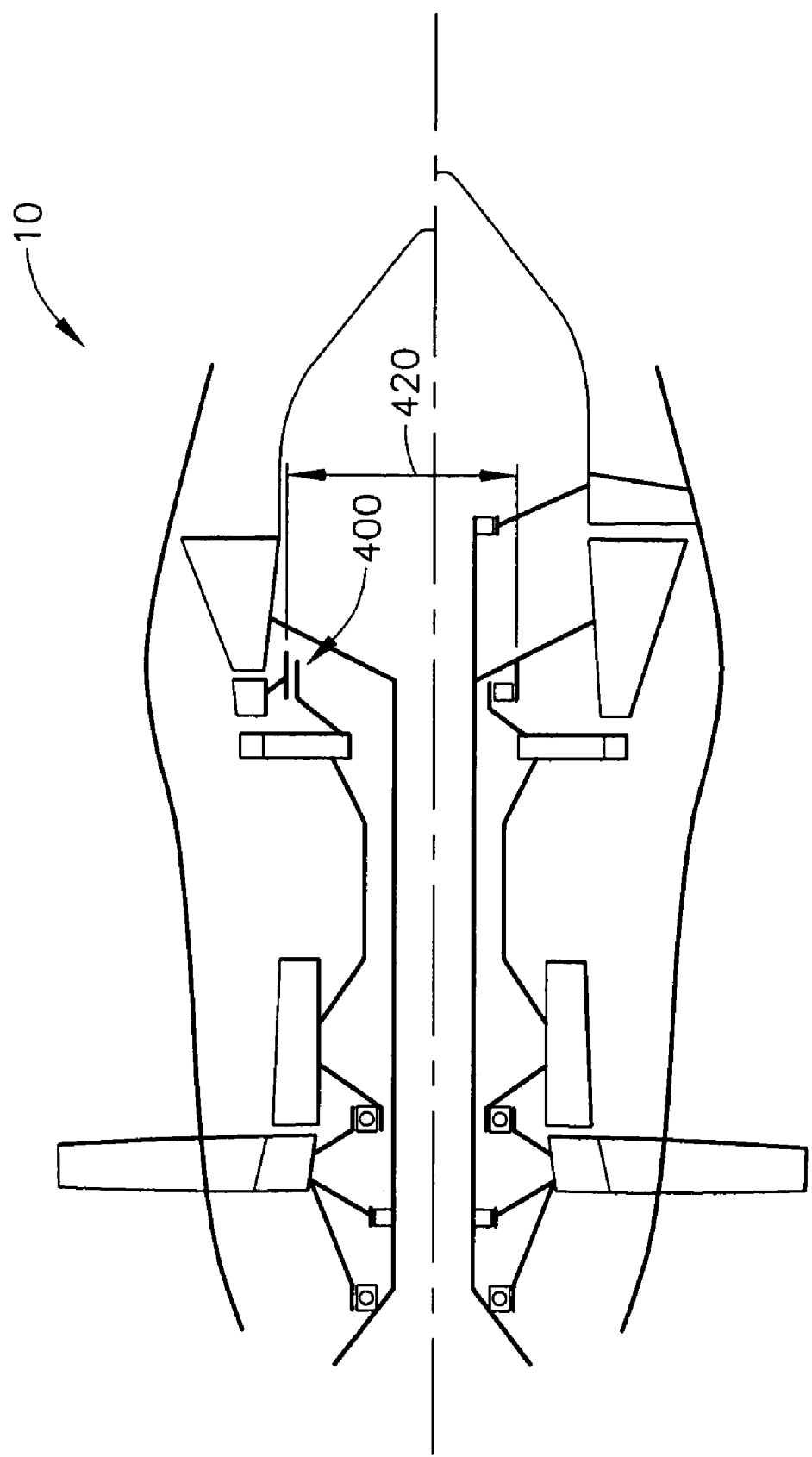
FIG. 11 is a schematic illustration of a gas turbine engine including an exemplary foil bearing.
Figure 12:
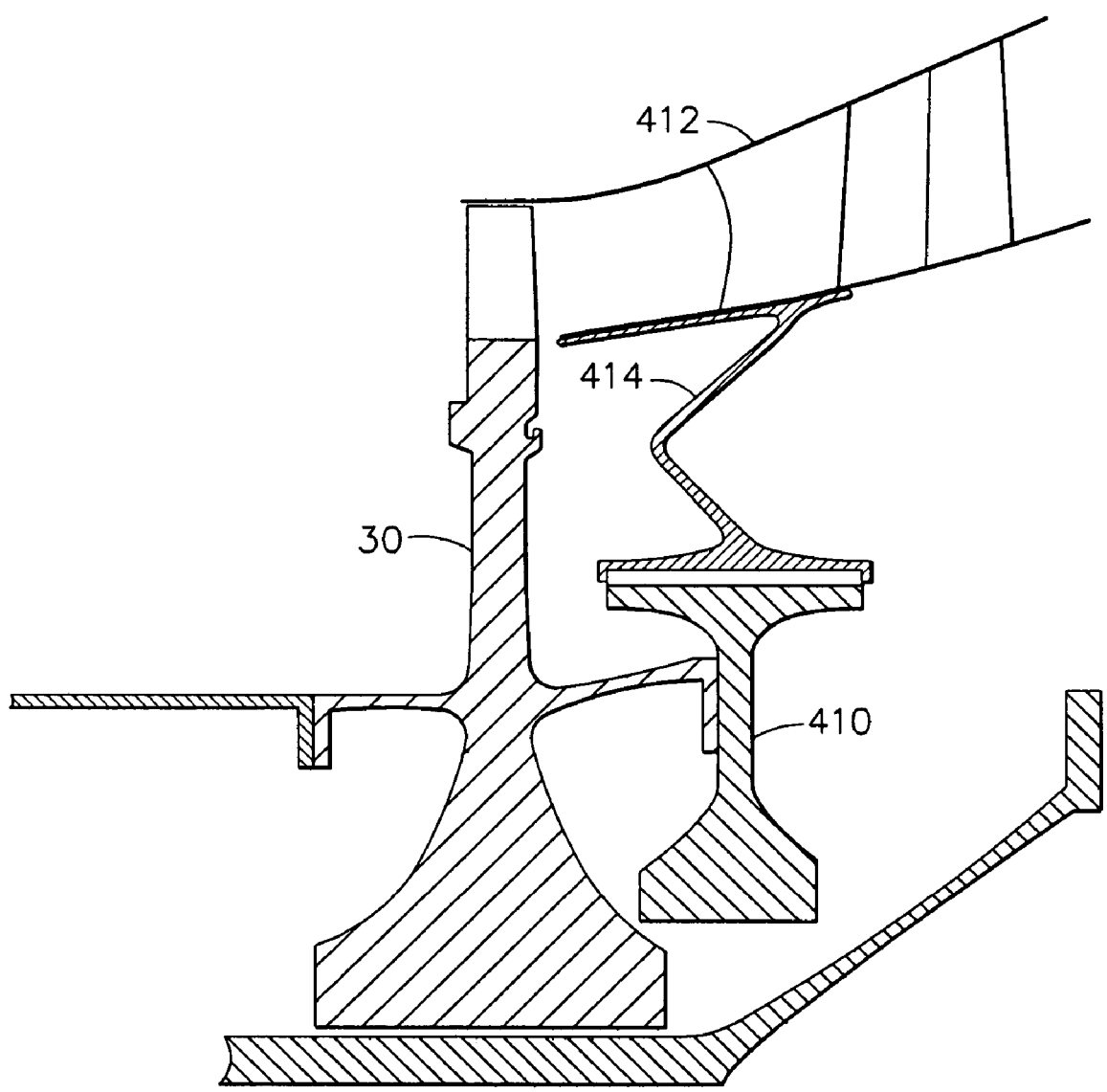
FIG. 12 illustrates a portion of a gas turbine engine including the exemplary foil bearing shown in FIG. 11.

FIG. 11 is a schematic illustration of gas turbine engine 10 including at least one foil bearing 400. FIG. 12 illustrates a portion of gas turbine engine 10 including foil bearing 400. In one embodiment, high-pressure turbine 30 is coupled to a high-pressure turbine spool 410 which is coupled to a low-pressure turbine stage 1 nozzle assembly 412 through a support 414. Foil bearing 400 extends between support 414 and high-pressure turbine spool 410. More specifically, foil bearing 400 has an inner diameter and/or width 420 that is selectively sized to enable foil bearing 400 to circumscribe and outer periphery of high-pressure turbine spool 410. Accordingly, bearing 400 facilitates providing support to high-pressure turbine 30.

In another embodiment, high-pressure turbine 30 is coupled to a high-pressure turbine spool 410 which is rotatably coupled to turbine mid-frame 60 through support 414. Foil bearing 400 extends between support 414 and high-pressure turbine spool 410. More specifically, foil bearing 400 has an inner diameter and/or width 420 that is selectively sized such that foil bearing 400 circumscribes and outer periphery of high-pressure turbine spool 410 and thus facilitates providing support to high-pressure turbine 30. In a further embodiment, each respective roller bearing within gas turbine 10 is replaced with a foil bearing.

The above-described foil bearing systems provide a cost-effective and highly reliable method for improving clearance control of a counter-rotating low-pressure turbine rotor. Moreover, because of the size of the counter-rotating low-pressure turbine rotor, maneuver loads may affect the operation of the gas turbine engine. Accordingly, fabricating a gas turbine engine that includes foil bearings facilitates reducing the affects of maneuver loads on the counter-rotating low-pressure turbine while also increasing clearance control and sealing between the rotors. Further, using foil bearings within the gas turbine engine facilitates reducing a fabrication cost of the gas turbine engine since the foil bearings do not require lubrication, have no DN speed limit, wherein D is defined as a diameter of the bearing bore in millimeters, and N is defined as the top speed of the bearing in revolutions per minute, require no maintenance, and are self-acting hydrodynamic "float on air" devices.

Additionally, foil bearings can be used to complement existing conventional oil bearings during maneuver loads and/or to eliminate the need for lube, scavenge, drain systems as well as sump pressurization and vent across the counter-rotating low-pressure turbine module. When foil bearings are utilized in a gas turbine engine having a counter-rotating turbine, both conventional and differential bearings are eliminated. The method and system described herein further facilitate enabling the support of the three rotor design with utilizing two main frames and eliminates the need for a conventional turbine rear frame thus optimizing rotor support under all conditions while reducing system weight, cost, and complexity.

Exemplary embodiments of gas turbine systems are described above in detail. The gas turbine systems are not limited to the specific embodiments described herein, but rather, components of the systems may be utilized independently and separately from other components described herein. Each gas path component can also be used in combination with other gas path components.

While the invention has been described in terms of various specific embodiments, those skilled in the art will recognize that the invention can be practiced with modification within the spirit and scope of the claims.

What is claimed is:

1. A method for assembling a gas turbine engine, said method comprising:
   providing a low-pressure turbine outer rotor configured to rotate in a second direction that is opposite the first rotational direction;
   providing a low-pressure turbine inner rotor configured to rotate in a first direction;
   coupling the inner rotor radially inward of the outer rotor;
   coupling at least one foil bearing radially outward of said outer rotor to facilitate improving clearance control between a first rotating component and at least one of a second rotating component and a non-rotating component.

2. A method in accordance with claim 1 further comprising:
   positioning the outer rotor radially inward of an outer casing, wherein the outer rotor includes a plurality of axially-spaced rows of outer blades that are rotatable therewith and extend radially inward from the outer casing, and
   wherein the inner rotor includes a plurality of axially-spaced rows of inner blades that extend radially outward and are axially interdigitated with the outer blades.

3. A method in accordance with claim 1 further comprising coupling a plurality of foil bearings to the outer rotor such that the foil bearings circumscribe the outer rotor.

4. A method in accordance with claim 1 further comprising coupling a plurality of foil bearings to the outer rotor such that the plurality of foil bearings are circumferentially spaced approximately equidistantly about an outer periphery of the outer rotor.

5. A method in accordance with claim 1 further comprising:
   coupling a first shaft between the inner rotor and a first fan;
   coupling a second shaft between the outer rotor and a second fan; and
   coupling a differential foil bearing between the first and second shafts.

6. A method in accordance with claim 1 further comprising coupling a foil bearing between a high-pressure turbine spool and at least one of a low-pressure turbine stage one nozzle and a turbine mid-frame such that the foil bearing supports the high-pressure turbine spool.

7. A method in accordance with claim 6 wherein coupling a foil bearing between a high-pressure turbine spool and at least one of a low-pressure turbine stage one nozzle and a turbine mid-frame further comprises coupling the foil bearing about an outer circumference of the high-pressure turbine spool such that the foil bearing supports the high-pressure turbine.

8. A rotor assembly comprising:
   an inner rotor configured to rotate in a first rotational direction;
   an outer rotor configured to rotate in a second rotational direction that is opposite the first rotational direction; and
   at least one foil bearing configured to support at least one of said inner and outer rotors, said inner rotor is coupled radially inward of said outer rotor, said foil bearing is coupled radially outward of said outer rotor.

9. A rotor assembly in accordance with claim 8 wherein said outer rotor is coupled radially inward of an outer casing and includes a plurality of axially-spaced rows of outer blades, said outer blades extend radially inward from said outer casing, and said inner rotor includes a plurality of axially-spaced rows of inner blades, said inner blades extending radially outward such that said inner blades are axially interdigitated with said outer blades.

10. A rotor assembly in accordance with claim 8 further comprising a plurality of foil bearings, wherein said foil bearings are coupled to said outer rotor such that said foil bearings circumscribe said outer rotor.

11. A rotor assembly in accordance with claim 8 further comprising a plurality of foil bearings circumferentially spaced approximately equidistantly about an outer periphery of said outer rotor.

12. A rotor assembly in accordance with claim 8 further comprising four foil bearings circumferentially spaced approximately equidistantly about an outer periphery of said outer rotor.

13. A rotor assembly in accordance with claim 8 further comprising:
   a first shaft coupled to said inner rotor and a first fan;
   a second shaft coupled to said outer rotor and a second fan; and
   a differential foil bearing positioned between said first and second shafts.

14. A gas turbine engine comprising:
   a low-pressure counter-rotating turbine comprising an inner rotor configured to rotate in a first rotational direction, and an outer rotor configured to rotate in a second rotational direction that is opposite the first rotational direction, said inner rotor is coupled radially inward of said outer rotor; and
   at least one foil bearing configured to support at least one of said inner and outer rotors, said foil bearing is coupled radially outward of said outer rotor.

15. A gas turbine engine in accordance with claim 14 wherein said outer rotor is coupled radially inward of an outer casing and includes a plurality of axially-spaced rows of outer blades, said outer blades extend radially inward from said outer casing, and said inner rotor includes a plurality of axially-spaced rows of inner blades, said inner blades extending radially outward such that said inner blades are axially interdigitated with said outer blades.

16. A gas turbine engine in accordance with claim 14 further comprising a plurality of foil bearings, wherein said foil bearings are coupled to said outer rotor such that said plurality of foil bearings circumscribe said outer rotor.

17. A gas turbine engine in accordance with claim 14 further comprising a plurality of foil bearings that are circumferentially spaced approximately equidistantly about an outer periphery of said outer rotor.

18. A gas turbine engine in accordance with claim 14 further comprising:
  a first shaft coupled to said inner rotor and a first fan;
  a second shaft coupled to said outer rotor and a second fan; and
  a differential foil bearing positioned between said first and second shafts.

19. A gas turbine engine in accordance with claim 14 further comprising:
  a high-pressure turbine spool;
  at least one of a low-pressure turbine stage one nozzle and a turbine mid-frame; and
  a foil bearing coupled between at least one of said low-pressure turbine stage one nozzle and said turbine mid-frame such that said foil bearing supports the high-pressure turbine.

20. A gas turbine engine in accordance with claim 19 wherein said foil bearing is coupled about an outer circumference of said high-pressure turbine spool such that said foil bearing supports said high-pressure turbine.

* * * * *

UNITED STATES PATENT AND TRADEMARK OFFICE
CERTIFICATE OF CORRECTION

PATENT NO. : 7,195,446 B2 Page 1 of 1
APPLICATION NO. : 10/976496
DATED : March 27, 2007
INVENTOR(S) : Seda et al.

It is certified that error appears in the above-identified patent and that said Letters Patent is hereby corrected as shown below:

Column 1, line 6, delete "Take Order NAS2-01135" and insert therefor -- Task Order NAS3-01135 --.

Signed and Sealed this

Sixth Day of November, 2007

JON W. DUDAS
*Director of the United States Patent and Trademark Office*